July 27, 1926.

F. E. HENDRICKSON

GRAIN CLEANER AND SAVER

Filed Jan. 12, 1925

Inventor
Fred E. Hendrickson.

By
Attorney

Patented July 27, 1926.

1,594,175

UNITED STATES PATENT OFFICE.

FRED E. HENDRICKSON, OF GRAND VALLEY, SOUTH DAKOTA.

GRAIN CLEANER AND SAVER.

Application filed January 12, 1925. Serial No. 2,006.

This invention relates to new and useful improvements in grain separators, and particularly to means for removing chaff from the grain.

One object of the invention is to provide means, associated with the blower fan of the separator, whereby the chaff will be blown upwardly, through the grain, before the grain and chaff reach the regular chaffer or sifting screen, with the result that the separation is accomplished in less time, and with greater effectiveness, than with the ordinary chaffer as now constructed and operated.

Another object is to provide means, associated with the blower fan, which accomplishes this separation as the grain passes over the shaking pan, such means being so constructed and arranged as to permit the free shaking of the pan.

Other objects and advantages will be apparent from the following description when taken in connection with the accompanying drawing.

Figures 1, 2:
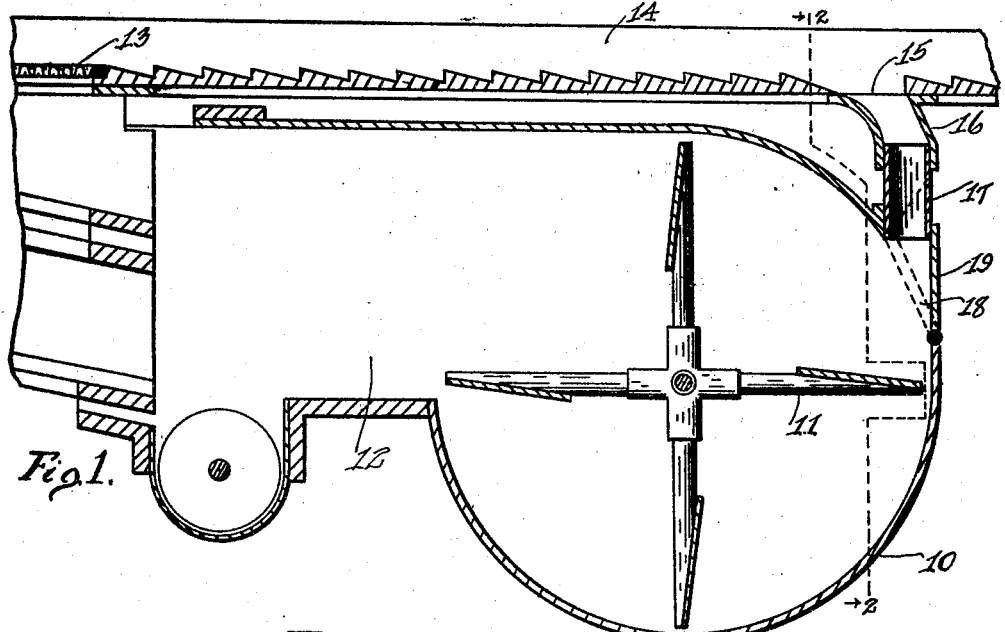
Figure 1 is a vertical longitudinal sectional view through the screens, fan blower, and grain pan, showing the invention.
Figure 2 is a vertical sectional view on the line 2—2 of Figure 1.

Referring particularly to the accompanying drawing, 10 represents the casing in which the fan blower 11 is mounted, and from which extends the blower pipe 12, leading upwardly to the adjacent end of the screen 13. The pan 14, of which the screen is a part, extends beyond the side of the casing, remote from the discharge end of the pipe 12, and in the bottom of the pan, directly above said side of the fan casing, is an opening 15. Leading downwardly from this opening 15 is a metal pipe or nipple 16, to the lower end of which is connected the upper end of the canvas tube or pipe 17. In the upper portion of the adjacent side of the blower casing 10 there is formed an opening 18, and pivotally mounted in the lower side of this opening, for movement toward and away from the opening, is a door 19. The portion of the lower end of the canvas tube 17, adjacent the casing 10, is secured to that side of the opening 18, while the other side of said canvas tube is secured to the free end of the door 19, whereby when the door is swung away from the opening, air is free to pass from the blower casing through the tube 17, the nipple 16, and through the opening 15, of the pan 14, whereby to form an additional or auxiliary means for blowing the chaff from the grain as it passes over the opening 15. To regulate the flow of air from the fan casing the door is provided with a suitable handle 20, on its hinge portion, externally of the casing 10, whereby said door may be swung toward or away from the opening 18, to open or close the opening to the desired degree.

By reason of the fact that the tube 17 is of canvas, the flexibility thereof will permit the pan 14 to be shaken in its normal function, while at the same time providing for efficient passage of air from the fan casing to the grain on the pan.

By this arrangement the grain will more effectively pass through the chaffer screen, thus permitting the said screen being closed to a greater extent. Furthermore, there will be less chaff on the sieves or screens, with the result that choking of the screens is prevented.

What is claimed is:

1. The combination with a grain pan and sieve of a separator, the former being arranged to deliver grain to the latter and having an opening in the bottom thereof surrounded by a nipple, of a fan including a casing provided with an auxiliary air blast nipple arranged below the nipple of the pan, a movable closure in said auxiliary blast nipple, and a flexible tube connected with and extending between the nipples of the casing and pan, a side of one end of said tube being secured to said closure and adapted to be collapsed by said closure whereby to regulate the discharge of air upwardly through the tube and through the grain and chaff on the pan.

2. In a grain separator, the combination with the grain pan having an opening, a blast fan including a casing, the fan casing having an auxiliary outlet opening, of a flexible tube connected to the opening of the pan and the auxiliary opening of the casing, and a door movably mounted in the auxiliary opening of the casing and connected with said flexible tube, whereby to collapse the tube and control the blast of air from the fan casing through the pan opening.

In testimony whereof, I affix my signature.

FRED E. HENDRICKSON.